No. 650,066. Patented May 22, 1900.
W. KÜTTNER.
CALCULATING MACHINE.
(Application filed Jan. 23, 1895.)

(No Model.) 6 Sheets—Sheet 1.

Witnesses
F. L. Ourand.
George J. Weber

Inventor
Wm. Küttner
By C. F. Reichelt
Attorney

No. 650,066. Patented May 22, 1900.
W. KÜTTNER.
CALCULATING MACHINE.
(Application filed Jan. 23, 1895.)

(No Model.) 6 Sheets—Sheet 2.

Witnesses
F. L. Orrand
George J. Heber

Inventor
Wm Küttner
By C. F. Reichelt
Attorney No. 650,066. Patented May 22, 1900.
W. KÜTTNER.
CALCULATING MACHINE.
(Application filed Jan. 23, 1895.)

(No Model.) 6 Sheets—Sheet 4.

Witnesses
F. L. Durand
George J. Heber

Inventor
Wm Küttner
By C. F. Reichelt
Attorney

THE NORRIS PETERS CO., PHOTO-LITHO., WASHINGTON, D. C.

No. 650,066. Patented May 22, 1900.
W. KÜTTNER.
CALCULATING MACHINE.
(Application filed Jan. 23, 1895.)
(No Model.) 6 Sheets—Sheet 5.

Witnesses
F. L. Ourand
George J. Hefer

Inventor
Wm Küttner.
By C. F. Reichelt
Attorney

UNITED STATES PATENT OFFICE.

WILLIAM KÜTTNER, OF BURGK, GERMANY.

CALCULATING-MACHINE.

SPECIFICATION forming part of Letters Patent No. 650,066, dated May 22, 1900.

Application filed January 23, 1895. Serial No. 535,965. (No model.)

*To all whom it may concern:*

Be it known that I, WILLIAM KÜTTNER, a citizen of the Kingdom of Saxony, and a resident of Burgk, near Potschappel, in the Kingdom of Saxony, German Empire, have invented certain new and useful Improvements in Calculating-Machines—Mechanical Calculators—(for which I have received a German patent, dated November 23, 1894, No. 84,269, and a Swiss patent, dated December 7, 1894, No. 9,450,) of which the following is a specification.

My invention relates to certain new and useful improvements in calculating-machines adapted to perform the fundamental arithmetic operations.

My invention consists in a main driving axle or shaft, upon which is mounted a series of calculating-wheels provided with a setting-ring and a series of teeth and which operate the registering-drums placed upon a parallel shaft through the medium of gear-wheels secured to the hubs of the registering-drums, the tens-transfer wheels, which are operated by the registering drums or wheels through the means of a transfer-lever provided with two tooth-like projections and a cam, ratchet-teeth, and springs to hold the transfer-lever in position, and revolution counter-wheels and radiating drums which are operated in turn, as will be more fully described hereinafter.

In order to explain fully the various parts of the mechanism, each system of parts similar in construction and purpose is described in regular order under the following divisions: First, the calculator and tens-transfer disks are mounted upon a common axle and keyed thereto and are operated, as herein shown, by means of a crank connected with the said driving-axle, the gears of the said calculator and the tens-transfer disks being turned in either direction and engaging with the subsequent mechanism by gearing hereinafter described in detail; second, the registering-drums for indicating the results of the various calculations made by the machine, and, third, the revolution-counter wheels mounted upon separate axles and adapted to register the number of revolutions of the driving-axle in either direction or the number of similar operations performed by the machine, either continued addition—that is, multiplication—or continued subtraction—that is, division. Besides these main systems of mechanism the machine embodies various new and useful devices for registering and checking the interaction between the calculating and registering parts, for transferring tens in either direction, and for turning back all of the reading-drums to the reading position, all of which will be described in detail with reference to the accompanying drawings, wherein—

Fig. 3, a vertical diametrical section of two adjacent calculating-wheels, looking from the back to the front of the machine and showing two ratchet-wheels on the remote side of the driving-axle; Fig. 4, a face view of the cam-ring of one of the calculating-disk wheels; Fig. 5, a transverse diametric sectional view thereof; Fig. 6, a face view of one of the calculating-disk wheels against which the cam-ring is placed. Figs. $7^a$ and $7^b$ are detail views showing the different positions assumed by the loose teeth 15 and their projections $15^\times$. Figs. $7^c$ and $7^d$ are detail views showing the different positions assumed by the teeth 41; Fig. 8, a face view of one of the calculating-disk wheels and one of the transfer-levers and registering-drums connected therewith. Fig. 9 is a face view, Fig. 10 a peripheral elevation, and Fig. 11 a diametric section, through one of the registering-drums and the gear and ratchet wheels connected therewith. Fig. 12 is a face view similar to Fig. 9 with the click-lever connected therewith; Fig. 13, a rear elevation of a series of said click-levers pivotally supported upon the angle-bar of the frame; Fig. 14, a transverse section through said angle-arm, showing a face view of one of the click-levers and the spring connected therewith; Fig. 15 a side elevation, Fig. 16 an edge elevation, Fig. 17 an opposite edge elevation, and Fig. 18 an opposite side elevation, of one of the transfer-levers; Fig. 19, an enlarged sectional detail through an adjacent pair of registering-drums and peripheral fragments of connecting calculating-disks, and Fig. 20 a similar view of a like pair of registering-drums and peripheral fragments of connecting tens-transfer wheels;

Fig. 21, a detail of one of the transfer-levers with a supporting frame-plate in section, showing the means for holding said lever into and out of gear with its registering-drum.

The operating shaft-wheels and registering-drums are all inclosed in a casing W, whose walls are divided into two sections $W'\ W^2$, the rear fixed section $W'$ resting firmly upon a base $W^3$ and supporting at its ends the main driving-axle 1 of the calculating-wheels 2 and tens-transfer wheels 3. The section $W^2$ is hinged to a longitudinal shaft 4, secured in bearings 5 upon the base $W^3$ for supporting the shafts 6 and 7, which carry the registering-drums 8 and revolution-counters 9. The said section $W^2$ being thus hinged and supported upon the shaft 4 is adapted to be swung away from the fixed section $W'$ of the casing to disengage the drums 8 and 9 from the wheels 2 and 3. The hinged section $W^2$ is thus secured at any desired point upon the fixed frame to engage drums 8 and 9 and intermediate mechanism with various calculating-wheels 2 and tens-transfer wheels 3, as will hereinafter appear, to extend the calculation to higher orders beyond that expressed by the number of calculating-wheels employed. A long bar V, containing eight notches $v'\ v^2\ v^3$, &c., each arranged at distances from each other, corresponding with the distances between the wheels, is affixed to the upper end of standard-plates 10, secured to the base $W^3$, and a tooth-like projection $w^\times$ upon the rim of the hinged casing-section $W^2$ engages any one of said notches, thus bringing the registering-drums opposite any desired one of the wheels from left to right and hold the front or hinged part of the case in fixed position with reference to the rear or main portion of said case.

The driving-axle 1 operates the whole machine and is connected by the gears 11 and 12 with the crank 13 at the right-hand end of the casing.

The axle 1 supports the main calculating mechanism, which consists of two sets of wheels, eight of which are the calculating-wheels 2 and eight of which are transfer-wheels 3, the latter serving to transfer the calculations to the higher places beyond the eight orders.

Figure 1:
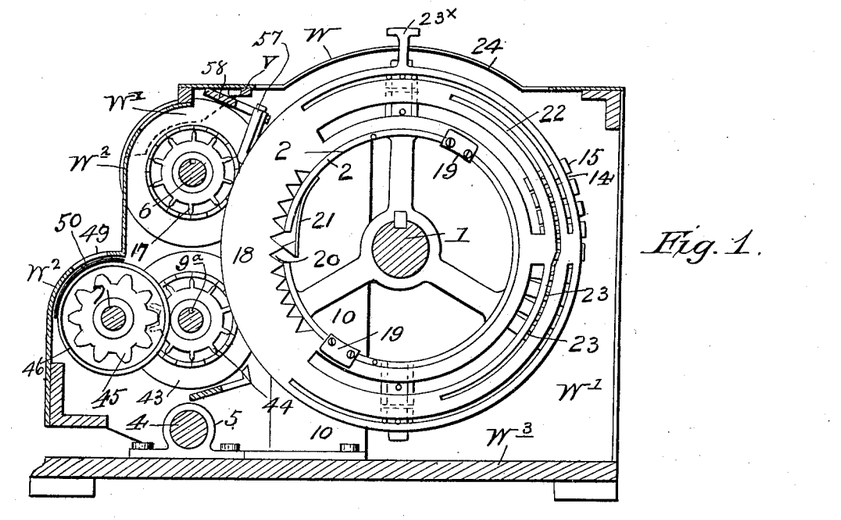
Figure 1 is a transverse sectional elevation of the machine in line $xx$ of Fig. 26, and Fig. 2 a similar view in line $yy$ of the same figure.
Figure 2:
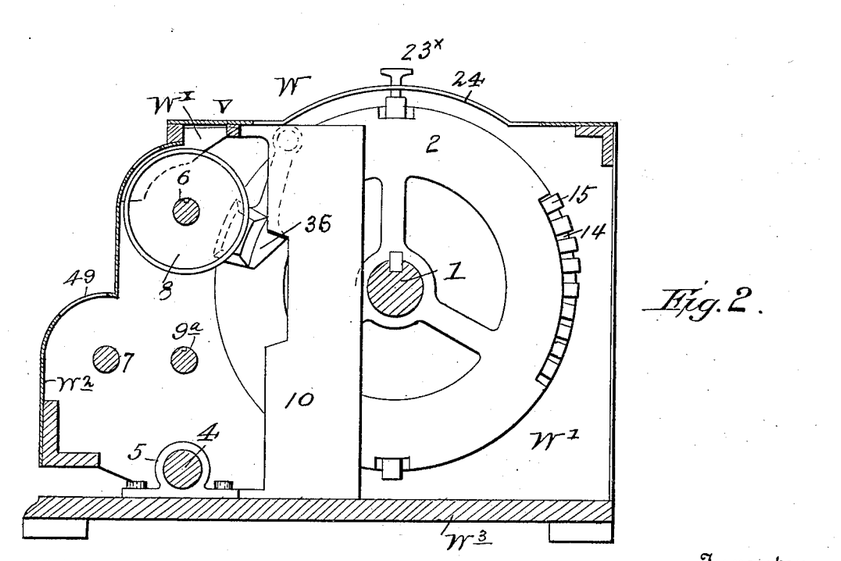
Figures 3, 4, 5, 6, 7A, 7B, 7C, 7D, 8:
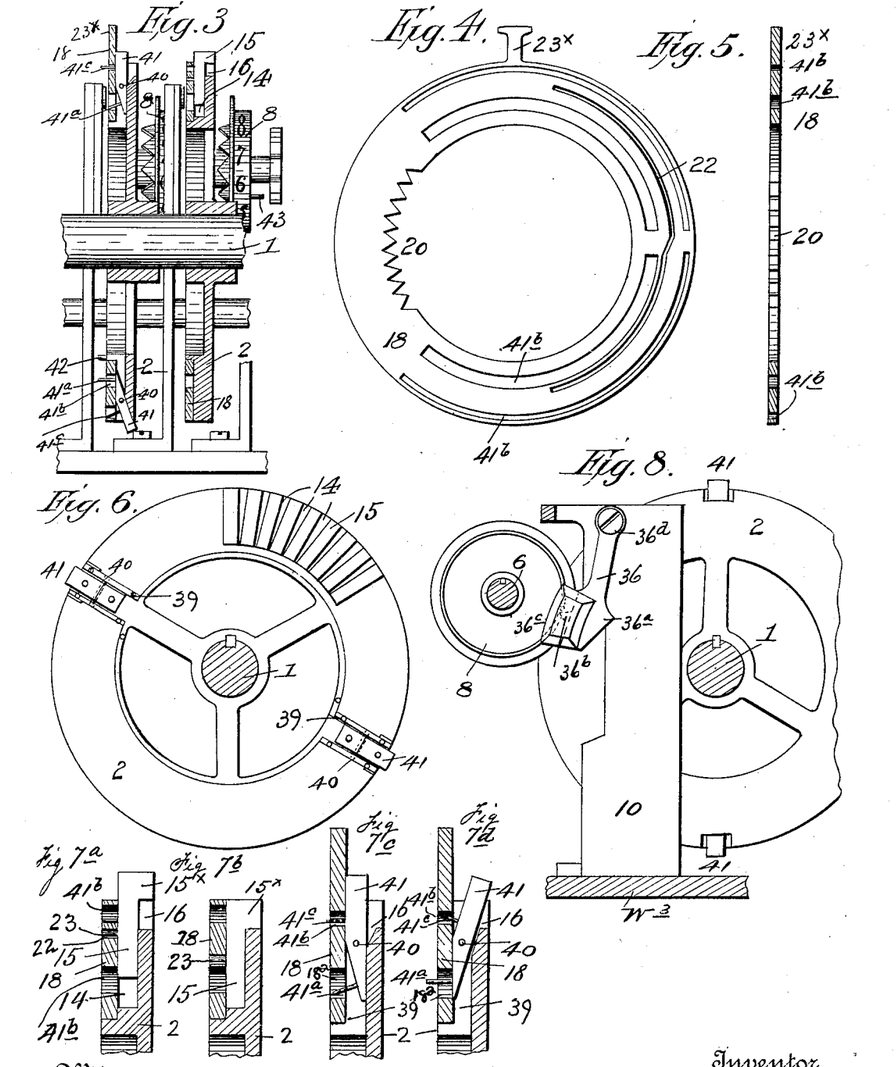

The calculating-wheels 2 are keyed to the axle 1 and are each provided with nine radial grooves 14 (shown in section, Fig. 3) to receive the loose teeth 15, Figs. 1, 2, $7^a$, and $7^b$, which fit, with their projections $15^\times$, into a common segmental groove 16 out around the outer edge of the opposite side of the wheel 2, as shown in Fig. 3, and extending a suitable distance around the periphery of the wheel to embrace all of said teeth. The teeth 15, with their projections $15^\times$, are shown by enlarged detail in Fig. $7^a$ in their position withdrawn from the groove 16 and projecting beyond the periphery of the wheel 2 and are shown in Fig. $7^b$ as drawn within the periphery of said wheel 2, with the projection $15^\times$ fitting in the segmental groove therein. The number of teeth thus projecting beyond the outer edge of the wheel 2 determine the number which enter into the calculation to be performed, as a certain number of projecting teeth 15, Fig. 1, engage with a gear-wheel 17, affixed to the hub of the registering-drum, as hereinafter described.

As the operator is to determine in each case the number to be added or subtracted he must be able to "set" the device so that the required number of teeth will project from each calculating-wheel. This is effected by a flat set-ring 18, secured to the wheel by means of clamps 19, which allow the said ring to slide upon the wheel 2. The ring 18 has a broken double concentric slot 22 formed therein, one half of which is nearer the center of the ring than the other half to receive the pins 23 of the teeth 15 for moving and holding the required number of teeth inward out of the slots provided therefor, and its inner circumference is provided with ratchet-teeth 20 to receive a spring-click 21, fastened to the wheel 2 for checking the ring and holding it securely in its adjusted position. The set-ring 18 is set by means of the handle 23× thereon, which projects through the slot 24 at the adjacent edge of the case, the latter being provided with a scale 25, reading from "0" to "9," whereby any desired number of teeth 15 may be made to project from the outer edge of the wheel 2, Fig. 1, according to the degree of displacement of the ring 18 upon the toothed calculating-wheel. In order to hold the calculating-wheel 2 in a fixed position while setting the ring 18, a spring-latch 26 is supported upon the casing W' at the left side thereof, consisting of a pin 27, supported in a bracket 28, secured to the casing and having a button 29 at its outer end and a wedge 30 at the inner end thereof, the latter adapted to engage with a notch 31 in the periphery of the last wheel M of the tens-transmitting set, a spring 32 serving to lift the pin 27 from engagement with the notch in the wheel when the pin is not pressed upon. When pin 27 is pressed upon, it will hold the shaft 1' and all of the wheels 2 and 3 at their fixed zero position.

When during the rotation of the axle 1, to which all of the keys 2 and 3 are keyed by means of the crank 13, the pin 27 is engaged with the tens-transfer wheel, the whole calculating mechanism may be arrested while the ring 18 is set to the position required for projecting the teeth and causing the rotation of the registering-drums to the number to be indicated.

Figures 9, 10, 11, 12, 13, 14, 15, 16, 17, 18, 19, 21:
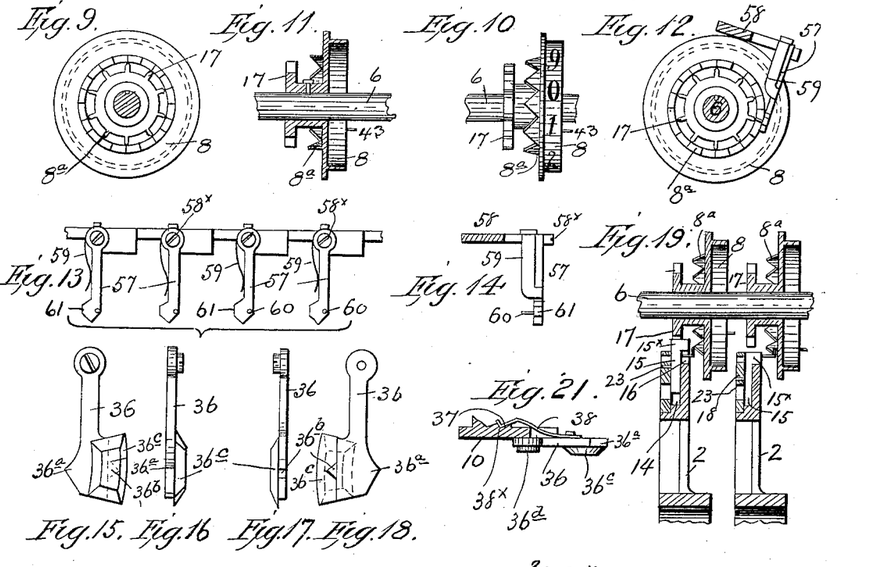

The mechanical operation of the parts thus described may be traced as follows: The crank 13 being turned to rotate the driving-axle 1, one complete revolution causes each of the projecting teeth of the calculating-disks to turn the corresponding registering mechanism one-tenth of a complete revolution; thus adding for one tooth one unit when the crank is turned to the right for the purpose of addition and subtraction accordingly when the crank is turned to the left. Each of the several systems of units, tens, &c., comprising a single calculating and registering mechanism which has thus far been considered as being independent from the rest is counted with the next higher similar system in addition and with the next lower in subtraction for the purpose of transferring tens in either direction. It is evident that the lowest registering-wheel at the right end of the machine by itself could only add from naught to nine, as the members "0" to "9" only are provided thereon, going to "0" again by addition of one more unit. The tens completed during a full revolution of each registering-wheel from "0" to "0" in the positive direction must be transferred to the next higher registering-wheel advancing it one place in order to register the result correctly. The tens-transferring device, Figs. 1, 2, and 9 to 12, consists of a lever 36, supported upon the plate 10, Fig. 2, and the teeth 15 of the wheels 2 and 3, Figs. 1 and 2, engage with the corresponding registering mechanism, turning the same one-tenth of a revolution every time the transfer-tooth 35 engages therewith. The transfer-lever 36, Figs. 15 to 18, has two tooth-like projections 36$^a$ and 36$^b$, one on each side, and a lateral cam 36$^c$, and is pivotally supported upon a pin 36$^d$, Fig. 8, fixed to the standard 10, which latter is secured to the base of the machine. When resting against the standard 10, the transfer-lever 36 is free to turn upon the pin 36$^d$, and in order to hold this lever in either of two fixed positions ratchet-teeth, Fig. 21, are formed on the opposite side of the standard 10 and a flat spring 38, screwed to said lever 36, passes around the edge of the standard 10, resting with its free end, to which a tooth-like projection 38× is fixed in either of two notches of the said ratchet-teeth at the back of the standard.

Upon the rim of the calculator-wheel 2 there are two radial grooves 39, located diametrically opposite each other and tapering at their extremity, as shown, Figs 7$^c$ and 7$^d$, in section. There are two of these radial grooves upon the same side of the plate, but at opposite edges, and in each of them is placed a tooth 41, and which teeth are alternately brought into action. Two radial grooves 39 are used, because the pivot 40 must be supported at each end. Across the grooves 39 pass the pins 40, Fig. 6, upon which teeth 41 are free to turn, the two details 7$^c$ 7$^d$ of Fig. 7 showing the two limiting positions to which the tooth 41 can be turned. It will be noticed that in detail 7$^c$ the tooth 41 is erect and pin 41$^c$ thereon passing through the slot 41$^b$ of the set-ring 18, while the pin 41$^a$, fitted to the tapering surface of the tooth 41, does not project through the slot 41$^b$ beyond the face of said set-ring. The detail 7$^d$ shows the same tooth 41 reclining toward the wheel 2, in which position the pin 41$^a$ projects through the slot 41$^b$, while the pin 41$^c$ has receded. The tooth 41 will, while in its erect position only, during the rotation of the calculating-wheel engage with the registering mechanism by means of the toothed wheel 17 upon the face of the registering-drum. The calculating-wheel 2, Fig. 3, has a pin 42 projecting from the face of the inner rim thereof, in front of which the lever 36 is suspended and is caused to oscillate, and a corresponding pin 43 projects from the flange of the registering-drum 8 behind the lever 36 at the instant when the projection 36$^b$ strikes against said pin 43, thereby pushing the lever 36 to one side of the line of travel of the pin 42 against the axle 6 and calculating and transfer wheels.

Figures 22, 23:
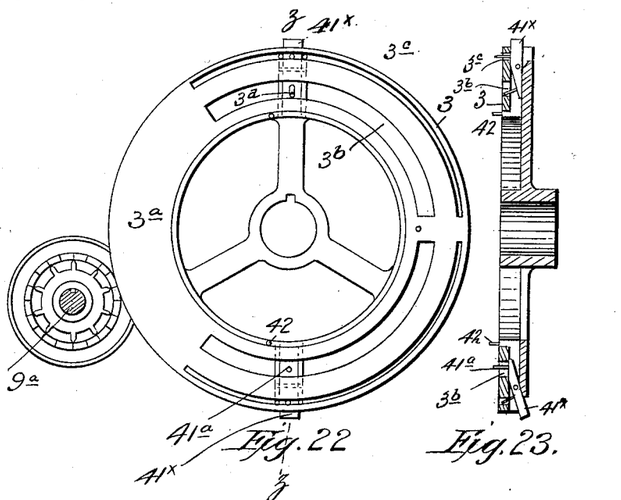
Fig. 22, a face view of one of the tens-transferring wheels and of the adjacent parts of a registering-drum with its gear and ratchet wheel connected therewith.
Fig. 23, a diametrical section in line $z\ z$ of Fig. 22.
Figure 26:
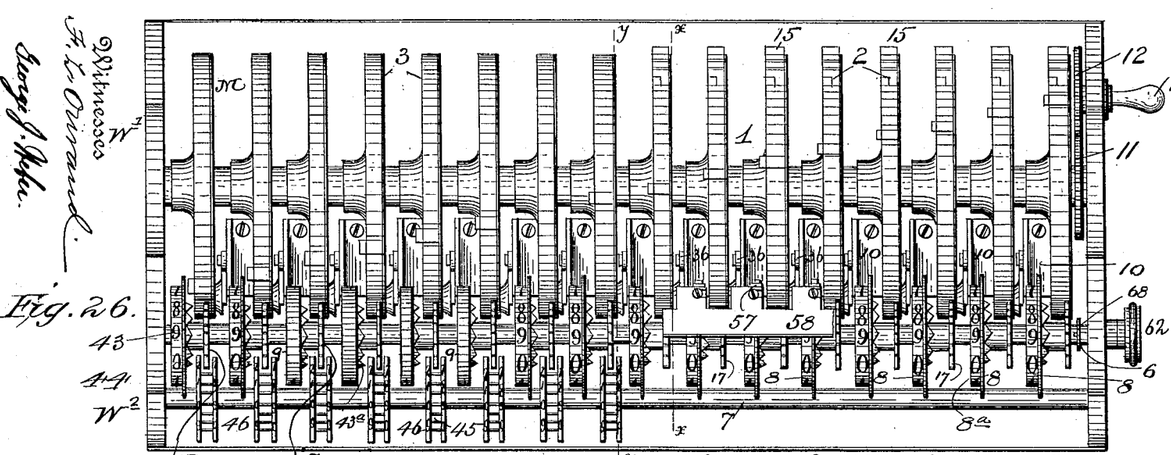
Fig. 26, a plan view of the machine with the casing-cover removed.
Figure 27:
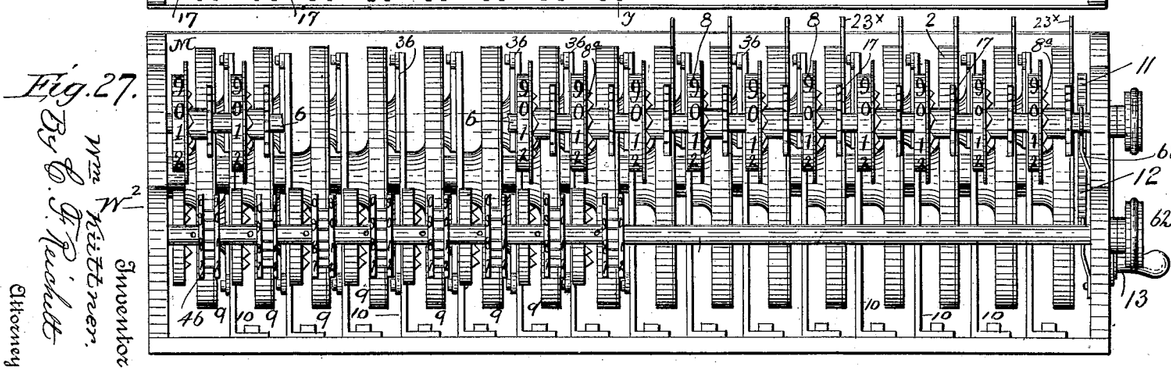
Fig. 27, a front elevation thereof with the front of the casing removed.

The operation of the tens-transfer mechanism is as follows: Starting with the lowest registering-drum 8, Fig. 26, at the right end of the machine, it is evident from the relative arrangement of the parts that the pin 43 with each complete revolution of the drum strikes once against the projection 36$^b$ of the lever 36, Fig. 8, pushing the lever back so that its cam 36ᶜ is placed directly in front of the slot 41ᵇ of the set-ring 18 of the second or next higher calculator-disk, in which position the lever 36 is held by the ratchet device above described. Since the pin 41ᵃ of the tooth 41 normally projects through the said slot 41ᵇ, as will appear later, the effect of the displacement of the lever 36 is to push back with its cam 36ᶜ the pin 41ᵃ of the next tooth while the pin passes the said lever. The detail 7ᶜ shows the pin 41ᵃ pushed into the slot 18ᵃ and the tooth 41 placed in an erect position. In its erect position the tooth 41 engages with the toothed gear 17 of the second registering-drum 8ᵃ, causing the latter to advance one-tenth of a revolution to the next higher number, as seen through the aperture W⁴, Fig. 28, of the casing. As soon as one of the teeth 41 has passed the lever 36 the latter is brought back to its normal position, covering with its cam 36ᶜ the slot 18ᵃ by the pin 42, which is but a few degrees behind the tooth 41 in the rim of the calculating-wheel. The pin 42 strikes against the projection 36ᵃ of the lever 36 and pushes the latter outward into its normal position, covering with its cam 36ᶜ the slot 18ᵃ, the lever 36 being held in its position by means of the ratchet 37. This lever 36 allows no ten-tooth 41 to pass it in erect position, as it pushes back every pin 41ᵃ projecting from the wheel. The transfer of tens in opposite direction during subtraction is performed by the same mechanism in an exactly-similar manner, except that the calculating-wheels are rotated in opposite direction and carry an oppositely-disposed tooth 41ˣ and pin 42² to operate during the reverse movement of the shaft upon the drum-gear and transfer-lever in a manner similar to that of the tooth 41 and pin 42 first described. The tens-transfer beyond the eighth order is performed by the additional eight transfer-wheels 3, similar in construction to the calculating-wheels in every detail pertaining to the tens-transferring device, hereinafter described. The transfer-wheel 3, Figs. 22 and 23, carries a ring-disk 3ᵃ, having circular slots 3ᵇ and 3ᶜ corresponding exactly with the slots 41ᵇ and the slots 42 in the wheel 2, Fig. 4, the teeth 41ˣ, with their pin 3ᵈ and 3ᵉ, being of the same construction as the teeth 41 and pins secured thereto and connected with the calculating-wheels, the mechanism for erecting and reclining the teeth 41ˣ consisting again of levers 36, operated upon by pins upon the rim of the registering drum and pins 3ᶠ 3ᶠ upon the face of the tens-transfer wheel 3, corresponding with the pin 42 of the calculating-wheel, the combined action of these parts effecting the tens-transfer upon the sixteenth place of orders and back from the said sixteenth place of orders to the first. In order to carry the direct calculation farther than the eighth place, the whole registering mechanism is contained in the front movable portion of the case, which can be tilted forward and slid longitudinally upon the shaft W', as hereinbefore described.

Figure 24:
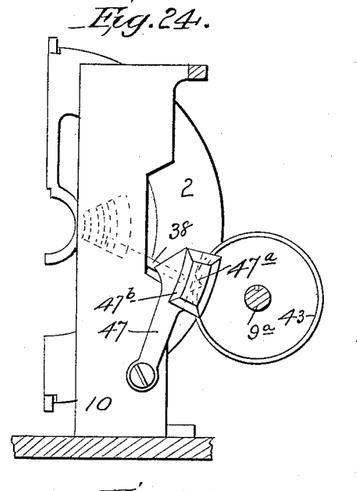
Fig. 24, a side elevation from the opposite side of one-half the wheel shown in Fig. 22, with a frame, supporting-plate, transfer-lever, and registering-drum connected therewith.
Figure 25:
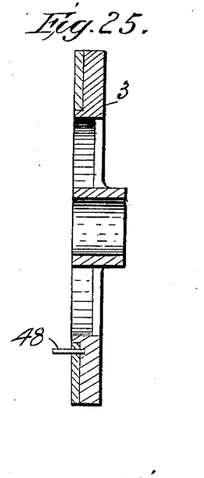
Fig. 25, a diametric section through one of the transfer-wheels shown in Figs. 22 and 23.

The revolution-counter is employed in connection with my invention in order to apply the machine to the operation of multiplication and division when it becomes necessary to register the number of successive revolutions of the calculating mechanism in either direction of rotation. For this purpose there are provided two additional sets of eight wheels each mounted upon the shafts 7 9ᵃ and adapted to gear with the teeth 41ˣ of the wheels 3. The counter-wheels 43 and gears 44 both turn freely upon their shaft 9ᵃ and are similar in construction to that of the registering-drums 8 and gears 17, fixed thereto, the only difference being that the drum has a flange and a set of numbers on its rim, while the counter-wheel 43 receives only a pin 43ᵃ, and the gear 44 engages with a gear 45, secured to the face of a reading counter-drum 46, supported upon the shaft 9, each gear having ten teeth and the reading-drum having two sets of numbers "0" to "9" running in opposite directions around the rim of the two disks, Fig. 26, and having their zero-marks one-tenth rotation apart. The lever 47, mounted upon the standard 10, corresponds exactly with the levers 36 and fulfils the same office for the revolution-counter drums, as shown in Fig. 24, that the said lever 36 does for the registering-drum. The first disk 3, counting from right to left, has a pin 48, Fig. 25, projecting from its face, in front of which the lever 47 is supported by the plate 10 to vibrate thereon. During each revolution of the wheel 3, which is keyed to the shaft 1, the pin 48 sets the lever 47, by means of the wedge-shaped projection 47ᵃ, Fig. 24, provided on the first lever 47, in such a manner that by moving the said lever back toward the shaft 1 and the next tooth 41, which passes the cam 47ᵇ of said 47, becomes erect in the same way as by the action of the lever 36 for controlling the registering-drums. In its erect position the tooth 41 engages with the gear 44, and hence with the gear 45 of the reading-disk, advancing the gear one tooth and the disk one-tenth revolution or one number ahead or back immediately after the tooth 41, Figs. 22 and 24, has passed the lever 47 the pin upon the wheel 3 following said tooth brings the said lever back to its normal position, in which it is held by means of the ratchet upon the standard 10, and allows the tooth 41 to pass in erect position until after it is again pushed back by the pin 48, when the calculating mechanism has made a complete revolution. The first disk 3, with its lever 47, the gears 44 and 45, and drums 46, would by themselves be sufficient to count revolutions of the calculating mechanism as long as their number does not exceed nine. For the purpose of registering numbers of revolutions up to the eighth order seven additional sets of wheels are provided to work in connection with the wheels 3 and the lever 47 in exactly the same manner as the tens-transferring mechanism, which has been described in detail.

Figure 28:
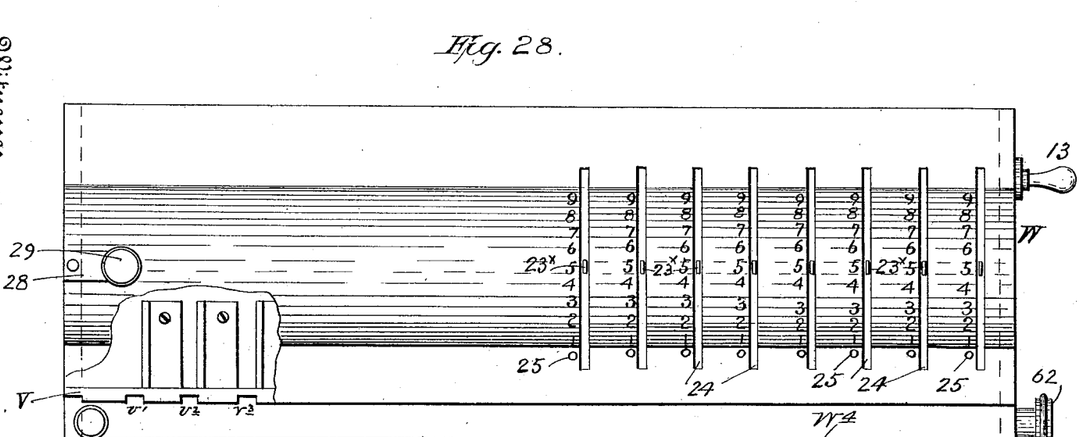
Fig. 28, a plan view of the machine, showing the casing partly broken away at one end.
Figure 29:
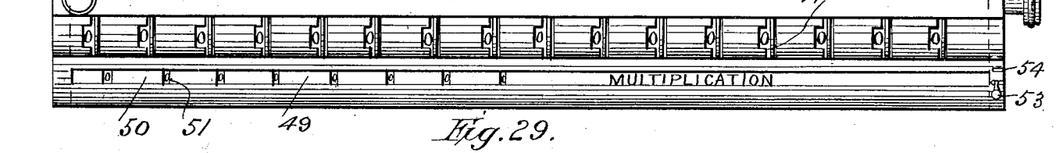
Fig. 29, a detail plan of the show-hole-cover plate.
Figure 30:
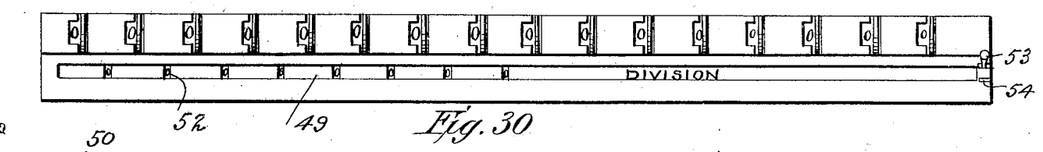
Fig. 30 a plan view, and Fig. 31 an end view, of the sector-plate for exposing and covering either of the series of number-drums.
Figure 31:
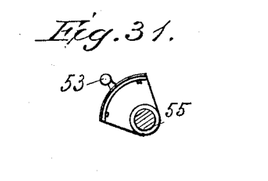
Figure 32:
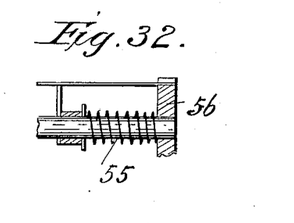
Fig. 32, a longitudinal sectional elevation of one end of said sector-plate.
Figure 33:
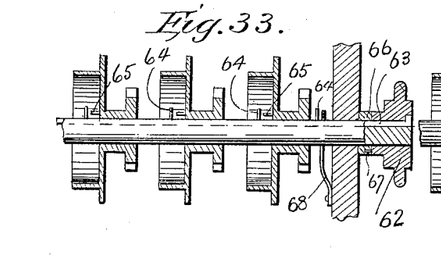
Fig. 33, a sectional elevation of the registering-drums, showing the shaft provided with a pin for each drum and adapted to be moved lengthwise to engage pins upon the hubs of said drums when they are to be turned back to zero after the calculation has been made.
Figures 34, 35:
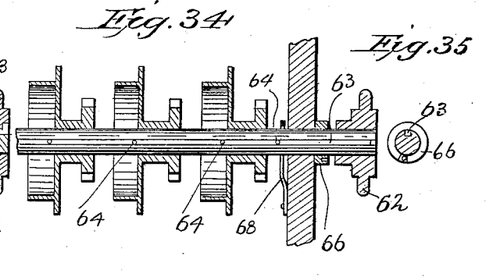
Fig. 34 is a similar view of said shaft and registering-drums, showing the shaft and its pins in position to engage with the said drums to turn them back to zero.
Fig. 35, a section through the shaft, showing a face view of the stationary notched ring for holding the shaft and registering-drums to the zero-marks.
Figure 36:
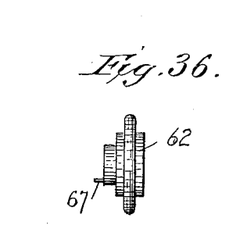
Fig. 36, a peripheral elevation of the thumb-wheel for operating the drum-shaft.
Figure 37:
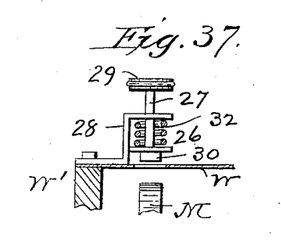
Fig. 37, a longitudinal section, and Fig. 38 a transverse section, of a spring-latch for holding the main shaft and calculating-wheels in their zero position while the devices for operating the registering-drums are being set at each operation.
Figure 38:
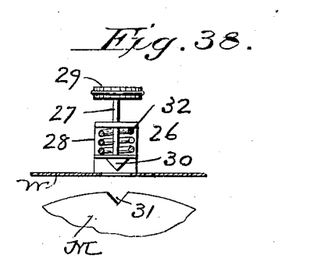

In order to read off the indications on the drum 46 or the number of revolutions made by the calculating mechanism in either direction, a long slot 49 is provided in the front casing of the machine, behind which slot the covered shield-plate 50, Fig. 28, appears, two rows of apertures 51 and 52, as shown in Fig. 30, being provided to allow the operator to see the figure upon the reading-drum 46, according to the position of the shield-plate to indicate "multiplication" or "division." The shield-plate 50 is held in either of said positions by means of a knot 53, the shank of which is adapted to engage with one of two slots 54, formed in the end of said plate, as shown in Fig. 29, a spring 55, Fig. 32, supported upon the shaft and pressing at one end against one end against one of the sections 56 and at the other end against the end wall of the casing, serving to hold the said knob firmly in either slots.

Figure 20:
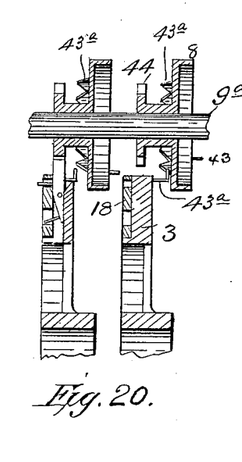

The device for restraining the relative motion between driving and driven mechanism to prevent "racing" of the registering-wheels employed by me is interposed between the calculating-disks 2 and their registering-drums 8 and also between the tens-transferring drums 3 and their registering-drums 8, and finally between the tens-transfer disk 3 and the revolution-counting mechanism. The registering-drum 8, Figs. 9, 10, and 11, and also the wheels 3, Fig. 20, are for this purpose provided with a crown-shaped ratchet $8^a$ and $43^a$, respectively, set laterally against said wheels upon the side, Fig. 26, which looks toward the corresponding calculator or tens-transfer disk. Between each of these "ratchet-crowns" and the corresponding disks 2 or 3 a click-lever 57 (Fig. 1 shows their section and Fig. 26 a partial plan view of the upper plate 58) is adapted to swing back and forth to engage with and release the wheels 8 and 43, as required. The click-levers 57 turn about set-screws $58^{\times}$, Figs. 13 and 14, and are provided with flat springs 59, opposing their tension to the displacement of the said click-lever in the direction of the arrows. The free end of the click-lever 57 has a pin 60 fixed thereto perpendicularly to the plane in which said lever turns. The click-lever is shown, Fig. 12, in proper position with reference to the ratchet $8^a$ of the wheel 8, its pin 60 resting between the teeth of the wheel $8^a$, in which position the said click-lever is held by the calculating-wheel 2 or tens-transfer disk 3 with its projection 61 immediately in front of the face of the said wheel. At the instant when a projecting tooth 15, 41, or $41^\times$ engages with the gear-wheel 17 the grooves 16 or $41^{\times\times}$ in the rim of the calculating-disk or the notch $41^{\times\times\times}$ of the tens-transfer disk permit the levers 57, which are lifted by the ratchet-teeth $8^a$, to recede, thus releasing the registering-drums 8 until the projecting tooth or teeth 15 41 $41^\times$ have passed by, each one of them turning the registering mechanism one-tenth rotation. Then the click 57 being pressed down again by the solid part of the disk 2 or 3 engages the registering mechanism and prevents any accidental rotation of the wheels connected therewith. The click-lever arrangement mounted on the lower plate 58, Fig. 1, is provided to check the interaction between the transfer-disks 3 and the revolution-counting mechanism, and is of precisely the same construction as the locking device above described.

In order to bring all of the registering-wheels back to the zero position at the end of each calculation, the following device is used and which is exactly alike for both axles and is shown in detail, Figs. 32 to 36: the knob 62 at the end of the axle is fixed to a long key-like bar 63, swung into a rectangular groove extending the full length of the axle. Upon said bar 62 a row of pins 64 is fixed perpendicular to the axle, one pin for each registering-drum 8, the latter having pins 65 parallel to the axle at such a distance therefrom that when the knob 62 and with it the bar 63 are drawn to the right, as in Fig. 34, the pins 64 will during a full rotation of the axle, effected by turning the knob 62, strike against the said pins 65, thereby transmitting the rotary motion to the drums 8. The zero position for the knob 62, and hence for the drums 8, is fixed by means of a ring 66, screwed to the end wall of the casing, said ring having a notch for receiving the pin 67 of the knob 62 to prevent its turning. A flat spring 68, having a circular loop passing around the axle, presses the bar 63 by means of the first pin 64 toward the left and tends to hold the knob 62 in the position shown in Fig. 33, in which more of the pins 64 interfere with the pins 65, and an accidental turning and lateral displacement of the knob 62 are entirely precluded. The notch in the ring 66 and the pins 64 and 65 are so arranged with respect to each other and with respect to the figures marked on the outside rim of the drum 8, one of which figures always appears through the apertures, Fig. 26, that at the instant the pin 67 drops into the notch in the ring 66 the zero position for all the registering-wheels is reached simultaneously, as shown in Fig. 28.

As stated above, the same mechanism precisely is used upon the revolution-counting axle to bring the disks thereon to their zero-mark.

I claim as my invention and desire to secure by Letters Patent—

1. The calculating-wheels, provided with teeth that are movable in and out in relation to the rim of the wheel, and which are provided with suitable pins which project through slots in the wheel, combined with the rings 18 clamped to the sides of the wheels, and having double concentric slots through which the pins of the teeth project, said rings being provided with handles by means of which they may be adjusted, and ratchet-teeth on their inner edges, and the clicks secured to the wheels for engaging with the ratchets and holding the rings in any desired position, substantially as shown.

2. The calculating-wheels provided with teeth which project beyond their surface, the rings 18 clamped to the sides of the wheels, the tens-transfer wheels 4, the registering-drums 8, and the revolution-counters 9, combined with the levers 36, provided with cam-surfaces $36^a$ $36^b$, and $36^c$, which are operated by means of the pins upon the teeth, and which project through slots in said wheel, the supporting-shafts 6 and 7, and the hinged section $W^2$ of the frame whereby the drums 8 and counters 9 can be moved out of contact with the wheels 2 and 3, substantially as shown.

3. In a calculating-machine, registering-drums 8, provided with ratchets upon one side, and the projecting pin 43 upon the other, the shaft 6 upon which the wheels are placed, the gear-wheel 17, and the click-lever 57 adapted to swing back and forth to engage with and release the wheels 8, the said click-levers being provided with pins 60, fixed thereto, combined with the wheel 2, the tens-transfer disk 3, provided with the projection 51 in front of the face of said wheel, the teeth 15, 41, and $41^\times$ provided with pins which project through slots in the face of the wheel, the lever 36 provided with cam-surfaces, and registering-drums 8 and revolution-counters 9, the parts being combined and arranged to operate, substantially as set forth.

4. In a calculating-machine, the wheels 2 provided with radial grooves, the pins $41^\times$, placed therein, and which are pivoted so that the pins have a rocking movement upon said pivots, and which are provided with pins which project through the slots in the wheel, and the levers 36 provided with cam-surfaces, combined with registering-drums 8 and revolution-counters 9, substantially as specified.

5. In a calculating-machine the combination with the frame of the main shaft, the calculating-disk provided with a series of number-teeth, a series of registering-disks, a pivoted transfer-lever for each disk carrying a spring-toothed arm and a notched ratchet-plate on the frame adapted to engage with said spring-tooth arm and hold it in either of two positions, substantially as described.

In testimony that I claim the foregoing as my invention I have signed my name in presence of two subscribing witnesses.

W. KÜTTNER.

Witnesses:
    CARL FR. REICHER,
    W. HAUPT.